(12) United States Patent
Zhao et al.

(10) Patent No.: US 10,789,120 B2
(45) Date of Patent: Sep. 29, 2020

(54) PREPROCESSOR AND ABNORMALITY PREDICTOR DIAGNOSIS SYSTEM

(71) Applicant: HITACHI POWER SOLUTIONS CO., LTD., Ibaraki (JP)

(72) Inventors: Pushe Zhao, Tokyo (JP); Masaru Kurihara, Tokyo (JP); Toujirou Noda, Hitachi (JP); Shigeyoshi Chikuma, Hitachi (JP)

(73) Assignee: HIATACHI POWER SOLUTIONS CO., LTD., Ibaraki (JP)

( * ) Notice: Subject to any disclaimer, the term of this patent is extended or adjusted under 35 U.S.C. 154(b) by 210 days.

(21) Appl. No.: 16/052,825

(22) Filed: Aug. 2, 2018

(65) Prior Publication Data
US 2019/0042344 A1 Feb. 7, 2019

(30) Foreign Application Priority Data
Aug. 3, 2017 (JP) .................. 2017-150773

(51) Int. Cl.
*G06F 11/00* (2006.01)
*G06F 11/07* (2006.01)
(Continued)

(52) U.S. Cl.
CPC ........ *G06F 11/079* (2013.01); *G05B 23/0243* (2013.01); *G06F 11/0721* (2013.01);
(Continued)

(58) Field of Classification Search
CPC ............... G06F 11/079; G06F 11/0721; G06F 11/0751; G06F 11/0775; G06F 11/3058;
(Continued)

(56) References Cited

U.S. PATENT DOCUMENTS

2013/0325782 A1* 12/2013 Fujimaki ................ G06N 7/005
706/46
2015/0227837 A1* 8/2015 Clifton ................... G06N 7/005
706/52

(Continued)

FOREIGN PATENT DOCUMENTS

JP 2015-179443 A 10/2015

*Primary Examiner* — Joseph D Manoskey
(74) *Attorney, Agent, or Firm* — Volpe and Koenig, P.C.

(57) ABSTRACT

A preprocessor into which time-series sensor data is input includes a correspondence table associating sensor data with a physical unit. A physical extraction unit that obtains sensor data, and specifies a physical unit based on the correspondence table. A latent variable generation unit specifies a nonlinear function from the physical unit, and generates a latent variable for applying the sensor data to the specified nonlinear function. A latent variable addition unit obtains time-series sensor data and sets the data as a variable, applies the obtained time-series sensor data to the latent variable to generate time-series data and sets the data as a variable, and adds the generated time-series data to the obtained time-series sensor data to generate a data set of a plurality of variables. Then a relational expression estimation-processing unit that analyzes a relationship between the variables of the data set, and generates a linear relational expression.

13 Claims, 13 Drawing Sheets

(51) Int. Cl.
 *G06F 17/18* (2006.01)
 *G05B 23/02* (2006.01)
 *G06F 17/15* (2006.01)

(52) U.S. Cl.
 CPC ...... *G06F 11/0751* (2013.01); *G06F 11/0775* (2013.01); *G06F 17/15* (2013.01); *G06F 17/18* (2013.01)

(58) Field of Classification Search
 CPC ............ G06F 11/3065; G06F 11/3068; G06F 11/3072; G06F 11/3089; G06F 17/15; G06F 17/18; G05B 23/0243
 See application file for complete search history.

(56) References Cited

U.S. PATENT DOCUMENTS

| | | | |
|---|---|---|---|
| 2015/0269293 A1 | 9/2015 | Hatano et al. | |
| 2015/0276557 A1* | 10/2015 | Masuda | G06B 23/0243 702/182 |
| 2017/0116319 A1* | 4/2017 | Zhou | G06F 17/18 |
| 2017/0284896 A1* | 10/2017 | Harpale | G01M 15/14 |

\* cited by examiner

FIG. 2

| TIME | PRESSURE (bar) | TEMPERATURE (K) | CURRENT (A) | VOLTAGE (V) |
|---|---|---|---|---|
| 2017/01/01 08:00:00 | 2.3 | 65 | 5.1 | 200 |
| 2017/01/01 08:01:00 | 2.4 | 67 | 5.0 | 200 |
| 2017/01/01 08:02:00 | 2.3 | 68 | 5.2 | 200 |
| 2017/01/01 08:03:00 | 2.3 | 67 | 5.1 | 200 |
| 2017/01/01 08:04:00 | 2.2 | 67 | 4.9 | 200 |
| 2017/01/01 08:05:00 | 2.5 | 69 | 5.0 | 200 |
| 2017/01/01 08:06:00 | 2.4 | 68 | 5.0 | 200 |
| 2017/01/01 08:07:00 | 2.4 | 67 | 5.1 | 200 |
| 2017/01/01 08:08:00 | 2.3 | 67 | 5.0 | 200 |
| 2017/01/01 08:09:00 | 2.3 | 67 | 5.1 | 200 |
| 2017/01/01 08:10:00 | 2.4 | 68 | 5.2 | 200 |

FIG. 3

| TIME | X (SENSOR) | Y (SENSOR) | Z (SENSOR) | F(X, X) | F(X, Y) | F(X, Z) | F(X,Y,Z) | SIN(X) |
|---|---|---|---|---|---|---|---|---|
| 2017/01/01 08:00:00 | 2.3 | 65 | 5.1 | 5.3 | 149.5 | 11.7 | 762.5 | 0.7 |
| 2017/01/01 08:01:00 | 2.4 | 67 | 5 | 5.8 | 160.8 | 12.0 | 804.0 | 0.7 |
| 2017/01/01 08:02:00 | 2.3 | 68 | 5.2 | 5.3 | 156.4 | 12.0 | 813.3 | 0.7 |
| 2017/01/01 08:03:00 | 2.3 | 67 | 5.1 | 5.3 | 154.1 | 11.7 | 785.9 | 0.7 |
| 2017/01/01 08:04:00 | 2.2 | 67 | 4.9 | 4.8 | 147.4 | 10.8 | 722.3 | 0.8 |
| 2017/01/01 08:05:00 | 2.5 | 69 | 5 | 6.3 | 172.5 | 12.5 | 862.5 | 0.6 |
| 2017/01/01 08:06:00 | 2.4 | 68 | 5 | 5.8 | 163.2 | 12.0 | 816.0 | 0.7 |
| 2017/01/01 08:07:00 | 2.4 | 67 | 5.1 | 5.8 | 160.8 | 12.2 | 820.1 | 0.7 |
| 2017/01/01 08:08:00 | 2.3 | 67 | 5 | 5.3 | 154.1 | 11.5 | 770.5 | 0.7 |
| 2017/01/01 08:09:00 | 2.3 | 67 | 5.1 | 5.3 | 154.1 | 11.7 | 785.9 | 0.7 |
| 2017/01/01 08:10:00 | 2.4 | 68 | 5.2 | 5.8 | 163.2 | 12.5 | 848.6 | 0.7 |

PREPROCESSOR AND ABNORMALITY PREDICTOR DIAGNOSIS SYSTEM

BACKGROUND OF THE INVENTION

1. Field of the Invention

The present invention relates to a preprocessor and an abnormality predictor diagnosis system.

2. Description of the Related Art

An abnormality predictor diagnosis technology is used as one of technologies for enhancing maintenance of an apparatus using data analysis method for increasing an operation rate and a production rate of the apparatus. In order to increase diagnosis accuracy, utilizing a physical model reflecting the configuration and operation mechanism of the apparatus is considered to be effective.

Here, a physical model includes variables related to output/input of the apparatus and sensor data of the apparatus, and mathematical expressions reflecting the mechanism and the state of the apparatus using these variables and coefficients. Since generation of a physical model needs a lot of knowledge and experience, automatic generation of a physical model is also proposed.

JP 2015-179443 A discloses a technology that searches for an unassigned measured value on the basis of a first physical model representing a relationship between variables with unknown parameters and on the basis of an assigned measured value and generates a second physical model representing a relation between new variables.

SUMMARY OF THE INVENTION

With the use of the technique disclosed in JP 2015-179443 A, it would be possible to generate a physical model. According to the technique disclosed in JP 2015-179443 A, however, initial setting of the physical model would be necessary in order to generate a new physical model, and thus, new physical model generation would not be possible on an apparatus without a first physical model. In order to generate the first physical model, a large amount of data would be needed even with the use of a lot of knowledge and experience or with machine learning methods.

In view of these, an object of the present invention is to generate a mathematical expression constituting a physical model for abnormality predictor diagnosis without the need of preparing a large amount of sensor data.

A preprocessor according to an embodiment of the present invention is a preprocessor into which time-series sensor data is input, the preprocessor including: a correspondence table associating sensor data and a physical unit with each other; a list associating a physical unit and a nonlinear function with each other; a physical unit extraction unit that obtains sensor data, and specifies a physical unit from the obtained sensor data on the basis of the correspondence table; a latent variable generation unit that specifies, on the basis of the list, a nonlinear function from the physical unit specified by the physical unit extraction unit, and generates a latent variable for applying the sensor data to the specified nonlinear function; a latent variable addition unit that obtains time-series sensor data and sets the data as a variable, applies the obtained time-series sensor data to the latent variable generated by the latent variable generation unit to generate time-series data and set the data as a variable, and adds the generated time-series data to the obtained time-series sensor data to generate a data set of a plurality of variables; and a relational expression estimation processing unit that analyzes a relationship between the variables of the data set generated by the latent variable addition unit, and generates a linear relational expression.

According to an embodiment of the present invention, it is possible to generate a mathematical expression constituting a physical model for abnormality predictor diagnosis without the need for preparing a large amount of sensor data.

BRIEF DESCRIPTION OF THE DRAWINGS

FIG. 2 is a diagram illustrating exemplary multidimensional time-series sensor data;

FIG. 3 is a diagram illustrating exemplary latent variables;

DESCRIPTION OF THE PREFERRED EMBODIMENTS

Embodiments of the present invention are an abnormality predictor diagnosis apparatus or an abnormality predictor diagnosis system including a preprocessor and an abnormality predictor diagnosis processing unit. As an example of the present embodiment, the preprocessor and the abnormality predictor diagnosis processing unit may be implemented either by a general-purpose computer including a processor and a memory and having software that performs processing in accordance with a program, or by dedicated hardware rather than a general-purpose computer.

Alternatively, it is allowable to incorporate dedicated hardware in a computer to achieve implementation by combining software and hardware. The preprocessor may be externally connected for preprocessing of the abnormality predictor diagnosis processing unit or may be externally connected as a module shared with other data processing. Hereinafter, the embodiments will be described with reference to the drawings.

The following embodiments will illustrate an example of constructing a physical model constituted with variables and relational expressions from sensor data and domain knowledge (information), assigning diagnostic sensor data into the physical model, and then performing diagnosis of parameters of variable values and relational expressions.

Figure 1:
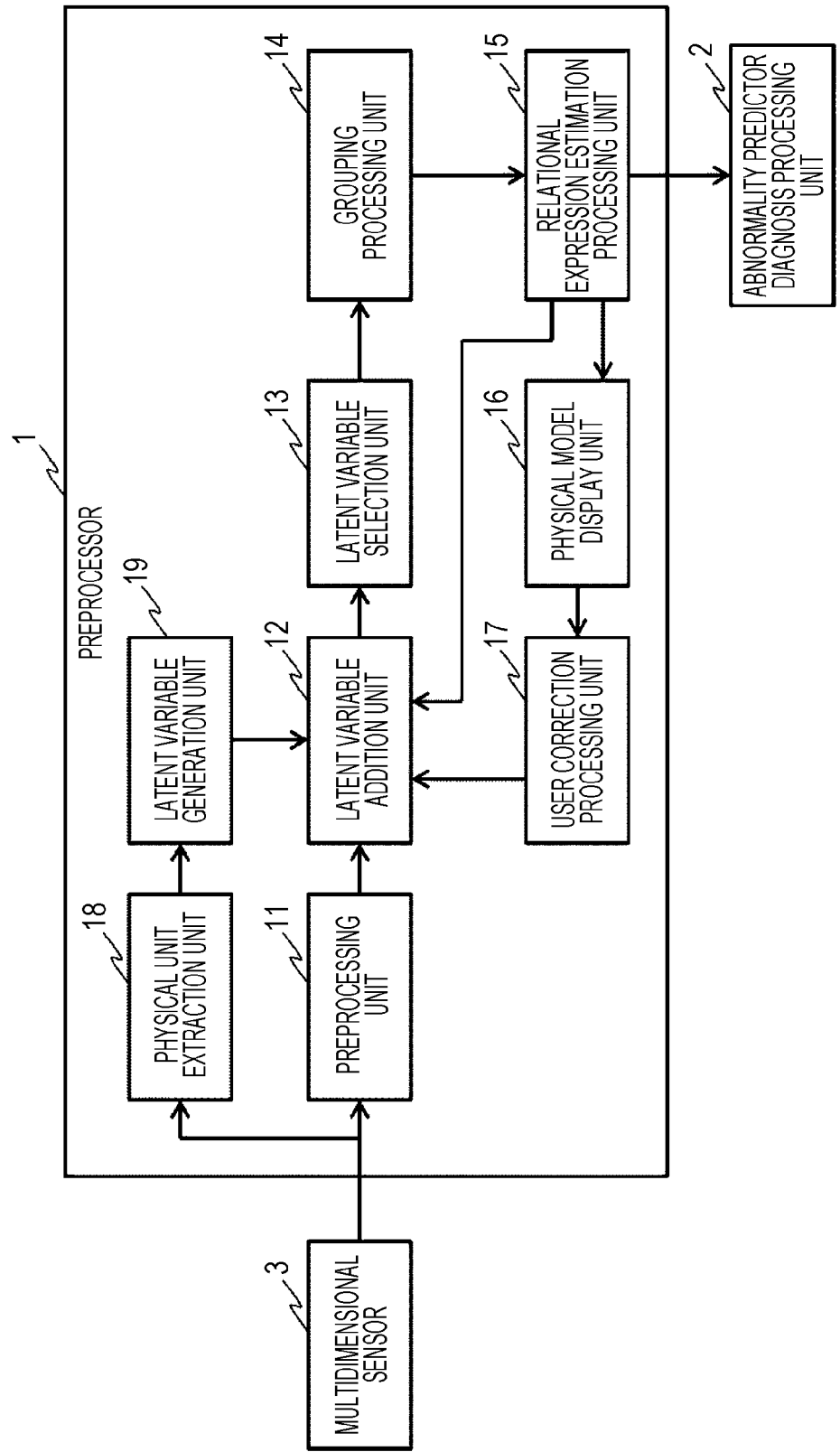
FIG. 1 is a diagram illustrating an exemplary abnormality predictor diagnosis system.

FIG. 1 is a diagram illustrating an exemplary abnormality predictor diagnosis system. As illustrated in FIG. 1, the abnormality predictor diagnosis system includes an abnormality predictor diagnosis processing unit 2, a preprocessor 1 in charge of preprocessing, and a multidimensional sensor 3. The multidimensional sensor 3 is a sensor that outputs multidimensional sensor data in time series and may be outside the abnormality predictor diagnosis system.

The preprocessor 1 includes a preprocessing unit 11, a latent variable addition unit 12, a latent variable selection unit 13, a grouping processing unit 14, a relational expression estimation processing unit 15, a physical model display unit 16, a user correction processing unit 17, a physical unit extraction unit 18, and a latent variable generation unit 19. The preprocessor 1 and the abnormality predictor diagnosis processing unit 2 may be combined into a single abnormality predictor diagnosis apparatus.

First, the multidimensional sensor 3 transmits time-series sensor data to the preprocessing unit 11. The preprocessing unit 11 performs processing on the sensor data, such as noise removal, outlier removal, or normalization, for subsequent processing such as correlation coefficient calculation.

The latent variable addition unit 12 adds the sensor data output from the preprocessing unit 11 and the latent variable output from the latent variable generation unit 19, and calculates the value of the latent variable. The latent variable is not included in the sensor data and is not directly observed data, still, it is a variable existing in a model reflecting a state of an apparatus in relation to the sensor data.

The latent variable in the present embodiment is a combination of sensor data and a nonlinear function. For example, SIN (sensor X+sensor Y)×sensor Z is a combination of data of sensor X, sensor Y, and sensor Z, and a function expressed by SIN ( ) addition sign (+), and a multiplication sign (×) of a trigonometric function.

In generating the latent variable, a variable generated by a combination of sensor data and a nonlinear function is a candidate latent variable, and a variable selected from the candidate latent variables with a preset criterion and a candidate latent variable having its physical significance confirmed are latent variables.

The sensor data is also transmitted to the physical unit extraction unit 18. The latent variable generation unit 19 generates a latent variable using a physical unit extracted by the physical unit extraction unit 18. This processing is processing for generating variables highly likely to reflect physical features of an apparatus as a sensing target (diagnosis target) of the multidimensional sensor 3, and is processing for enhancing diagnostic performance of the physical model.

In a case where information of a physical unit is not included in the sensor data output from the multidimensional sensor 3, the processing of the physical unit extraction unit 18 and the latent variable generation unit 19 may be skipped. The latent variable addition unit 12 adds the latent variable generated by the latent variable generation unit 19 in a case where the latent variable has been generated. In contrast, in a case where the latent variable has not been generated, the latent variable addition unit 12 adds a latent variable combining sensor data and another nonlinear function.

The latent variable selection unit 13 calculates an intra-pair correlation coefficient among a plurality of pieces of sensor data and latent variable data. The correlation coefficient calculation target is a pair of sensor data and sensor data, a pair of sensor data and latent variable data, and a pair of latent variable data and latent variable data. The correlation coefficient is an index for evaluating the degree of correlation between the pairs.

While calculation formula of the correlation coefficient is not limited, representative calculation formula is based on the Pearson calculation method. For example, given a data sequence $\{(x_i, y_i)\}$ $(i=1, \ldots, n)$ containing two sets of data, the correlation coefficient is calculated as follows.

$$R = \Sigma((x_i - x_a) \times (y_i - y_a)) / (SQRT(\Sigma(x_i - x_a)^2) \cdot SQRT(\Sigma(y_i - y_a)^2))$$

where, R is a correlation coefficient value, $x_a$ is an average value of $x_i$ in $i=1$ to n, $y_a$ is an average value of $y_i$ in $i=1$ to n, $\Sigma$ is calculation of a sum for $i=1$ to n, and SQRT is calculation of square root. While the correlation coefficient evaluates a linear relationship between variables, it is allowable to add a latent variable to evaluate both the nonlinear correlation and the correlation between a plurality of sensors.

The latent variable selection unit 13 may remove latent variables having low correlation with sensor data or other latent variables. This removal serves as preprocessing of the next grouping processing unit 14, and also leads to selection of a latent variable having high correlation. The sensor data may be selected in addition to the latent variable on the basis of the correlation.

The grouping processing unit 14 applies a hierarchical clustering method to the calculated correlation coefficients and divides the associated sensor data variables and latent variables into groups in accordance with the degree of the correlation. Latent variables not belonging to a group including sensor data and not related to any of sensor data may be removed by the result of division into groups.

Here, the hierarchical clustering method divides targets (for example, variables) into a plurality of groups on the basis of a predetermined index (for example, correlation). In this example, the sensor data or latent variables have high correlation with either sensor data or latent variables in the same group, while they have low correlation with sensor data and latent variables in different groups.

In this manner, since this method is intended to remove low correlation latent variables, correlation between sensor data and latent variables in the same group is not necessarily high, and clustering methods often used for abnormality predictor diagnosis (for example, a K-MEANS method), which is different from the method of dividing data by spatial distribution of data of the variable.

The relational expression estimation processing unit 15 performs multivariate linear regression analysis (multiple regression analysis) on each of the groups to obtain a relational expression between the variables of each of the groups. Due to the presence of latent variables, nonlinear relational expressions can be obtained even by linear analysis. Sensor data variables and latent variables, relational expressions, and correlation coefficients are collectively recorded to be as a physical model.

The physical model display unit 16 is a user interface for displaying sensor data, latent variables, and relational expressions of a physical model on a screen and for performing confirmation, correction, or removal of the latent variable by user's operation.

Thereafter, in accordance with the correction or removal in the physical model display unit 16, the user correction processing unit 17 transmits information for generating additional conditions for latent variables and information for removing latent variables to the latent variable addition unit 12.

In accordance with the information received from the user correction processing unit 17, the latent variable addition unit 12 to the physical model display unit 16 re-execute processing so as to reflect the correction by the user to the physical model. Finally, diagnostic sensor data is assigned to the physical model reflecting the correction by the user, and a result is transmitted to the abnormality predictor diagnosis processing unit 2.

FIG. 2 is a diagram illustrating exemplary multidimensional time-series sensor data. The sensor data includes time information 21 indicating the time of data measurement, and measured values 22 to 25 representing data of each of sensors of the multidimensional sensor 3. The measured value 22 is pressure information, the measured value 23 is temperature information, the measured value 24 is current information, and the measured value 25 is voltage information.

In addition to these, the sensor data may include or need not include information of a physical quantity, sensor physical unit, or a sensor ID. As illustrated in FIG. 2, multidimensional data of the measured values 22 to 25 are time-series data according to the time information 21.

In addition to the measured value by the multidimensional sensor 3, data collected via a network or data input by a human may be recorded as the measured values 22 to 25. Furthermore, while this example illustrates the time information 21 in a "YYYY/MM/DD HH:MM:SS" format, the information may be indicated in other formats or may be other information indicating time (for example, the number of cycles generated after operation start).

The preprocessing unit 11 unifies the format of the sensor data or the like on various sensor data as illustrated in measured values 22 to 25. For example, in a case where the format of the time information 21 differs between the sensors, the value of the time information 21 may be converted to a real number by unifying the time in units of seconds.

The preprocessing unit 11 may supplement missing data due to the time or may remove data that is out of a defined range, if any. For example, noise and outliers in sensor data may be removed using statistical methods (moving average, normal distribution, or the like). For this purpose, it is allowable to convert each of sensor data into data conforming to a normal distribution having an average value of "1" and a standard deviation of "0".

FIG. 3 is a diagram illustrating exemplary latent variables. Time information 31 and sensor data 32 to 34 illustrated in FIG. 3 respectively correspond to the time information 21 and the measured values 22 to 24 illustrated in FIG. 2. Specifically, the sensor ID of the sensor of the sensor data 32 is "X", the sensor ID of the sensor of the sensor data 33 is "Y", and the sensor ID of the sensor of the sensor data 34 is "Z".

As illustrated by the latent variables 35 to 38, the latent variable addition unit 12 adds latent variables in a combination of sensor data and a nonlinear function on the basis of the sensor data 32 to 34. Here, "F" is a nonlinear function. It is possible to obtain a plurality of latent variables 35 to 38 by using arguments of the nonlinear function F as a combination of sensor data 32 to 34 even in the same nonlinear function F.

For example, "X" of "F (X, X)" in the latent variable 35 is a sensor ID, indicating that the two arguments of the nonlinear function F are sensor data 32. In this manner, a plurality of same arguments may be applied to one nonlinear function F. Latent variables 36 to 38 are examples that apply mutually different arguments.

For example, it is allowable to apply various nonlinear functions (SIN of trigonometric function, EXP of exponential function, etc.) such as in "SIN (X)" of a latent variable 39 to generate various latent variables. While some examples of latent variables are illustrated in FIG. 3, it is preferable to generate a large number of latent variables. Generating a large number of latent variables increases the possibility to express the nonlinear relationship existing in an apparatus as a sensing target.

On the other hand, calculating a large number of latent variables (combinations of sensor data and nonlinear functions) might take a very long computation time and adding a very large number of latent variables might cause a heavy burden in subsequent processing, leading to affecting the accuracy of the subsequent processing.

In order to avoid this, on assumption that the state of the apparatus as a sensing target actually reflects merely a portion of the large number of latent variables and that the latent variable follow physical principles, the physical unit extraction unit 18 and the latent variable generation unit 19 generate a latent variable that follows the physical principle before addition of the latent variable so as to prevent generation of unnecessary latent variables to avoid a large amount of calculation.

Figure 4:
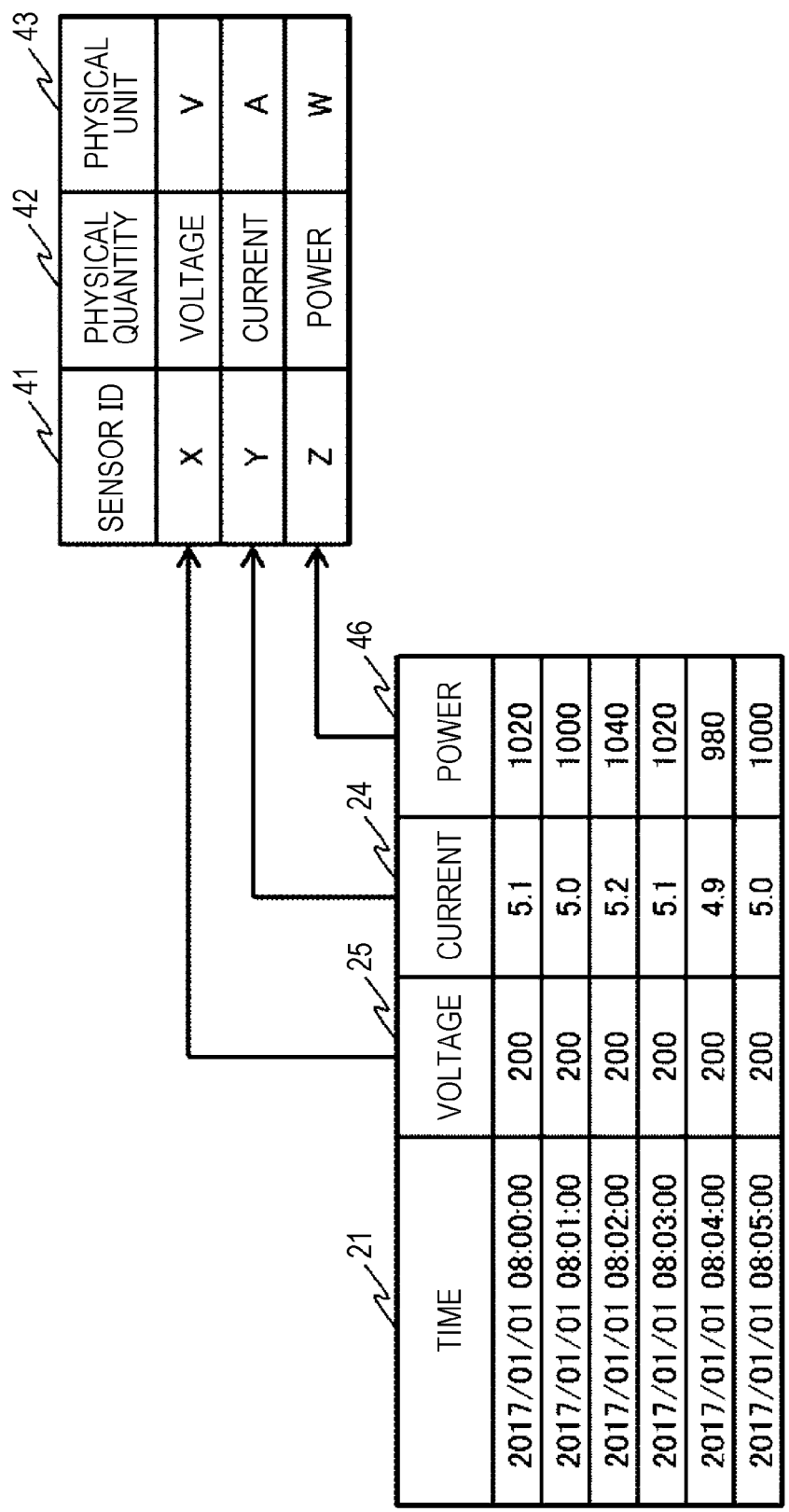
FIG. 4 is a diagram illustrating an exemplary correspondence table between a sensor and a physical unit.

As illustrated in FIG. 4, the preprocessor 1 includes a correspondence table of a sensor ID 41, a physical quantity 42, and a physical unit 43. The sensor ID 41 is an ID for identifying individual sensors. The physical quantity 42 is the type of the physical quantity measured by the sensor specified by the sensor ID 41, and examples of this include "voltage", "current", or "power".

The physical unit 43 is a unit for expressing the value of the physical quantity type. For example, "volt (V)" for "voltage", "ampere (A)" for the "current", and "watts (W)" for the "power".

After the sensor data has been input from the multidimensional sensor 3, the physical unit extraction unit 18 extracts the sensor ID or the physical quantity included in the sensor data and extracts the physical unit. The time information 21, measured value 25, and measured value 24 illustrated in FIG. 4 are the sensor data illustrated in FIG. 2. In the example of FIG. 4, "power" is also added as a measured value 46.

Here, a physical quantity is extracted from the input sensor data, and the sensor ID 41 and the physical unit 43 matching the physical quantity 42 of the correspondence table are extracted. Note that in a case where the sensor ID 41 can be extracted from the input sensor data, it is allowable to extract the physical quantity 42 and the physical unit 43 matching the sensor ID 41 of the correspondence table.

An example of generating a latent variable from the physical unit extracted by the physical unit extraction unit 18 will be described with reference to FIG. 5. The preprocessor 1 includes a nonlinear function list including correspondence information between a physical unit 51 and a nonlinear function 52. The latent variable generation unit 19 inputs a physical unit from the physical unit extraction unit 18, specifies the physical unit 51 that matches the input physical unit, and extracts the nonlinear function 52.

Figure 5:
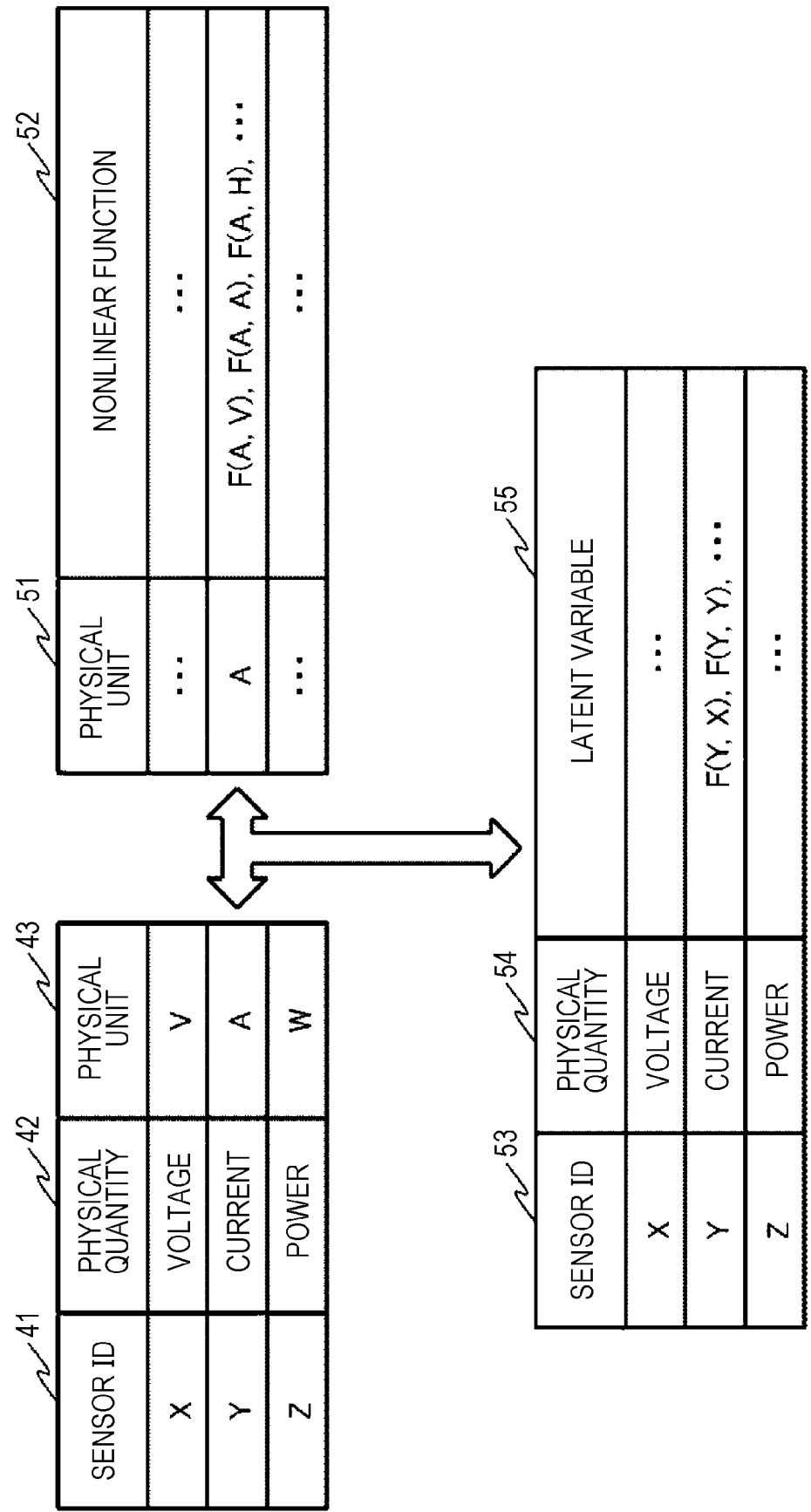
FIG. 5 is a diagram illustrating an example of latent variable generation.

When the extracted physical unit 43 is "A" in FIG. 5, nonlinear functions of "F (A, V)" and "F (A, A)" or the like are extracted as the nonlinear function 52 matching with "A" of the physical unit 51. When there is a sensor corresponding to the physical unit of the argument of the extracted one nonlinear function, one latent variable is generated from the nonlinear function and the sensor data of the physical unit.

That is, since "A" and "V" of "F (A, V)" exist as sensors having sensor ID 41 of "Y" and "X" respectively, arguments of the nonlinear functions are replaced by sensors ID 41, respectively, so as to generate a latent variable of "F (Y, X)". Similarly, the latent variable of "F (Y, Y)" is generated from "F (A, A)".

In this, since there is no sensor corresponding to "H" in "F (A, H)" (physical quantity of "H" is time), no latent variable corresponding to "F (A, H)" is generated. The latent variable generation unit 19 defines the generated latent variable as a latent variable 55 and associates the generated latent variable with the sensor ID 53 and the physical quantity 54. The sensor ID 53 and the physical quantity 54 correspond to the sensor ID 41 and the physical quantity 42, respectively.

While the example of FIG. 5 illustrates one type of function "F" alone as an example of the nonlinear function 52, the nonlinear functions 52 may include a plurality of types of nonlinear functions. In particular, nonlinear functions including arguments according to a physical principle of the apparatus as a sensing target, or nonlinear functions according to the physical principle are preferable.

For example, provided that there is a physical principle in which "A" ("current") changes together with a change in "V" ("voltage"), a nonlinear function including "V" and "A" would be preferable. Provided that there is a physical principle in a relationship of a change, a nonlinear function reflecting that relationship would be preferable.

Furthermore, while the described example is a case where the sensor ID, the physical quantity, or the physical unit is extracted from the sensor data, the physical unit may be extracted by user's operation. In the case of user's input, the latent variable 55 may be directly input in addition to the nonlinear function 52. The physical unit extraction unit 18 may extract a physical quantity instead of a physical unit and the latent variable generation unit 19 may use a physical quantity instead of the physical unit 51 and an argument of the nonlinear function 52.

Figure 6:
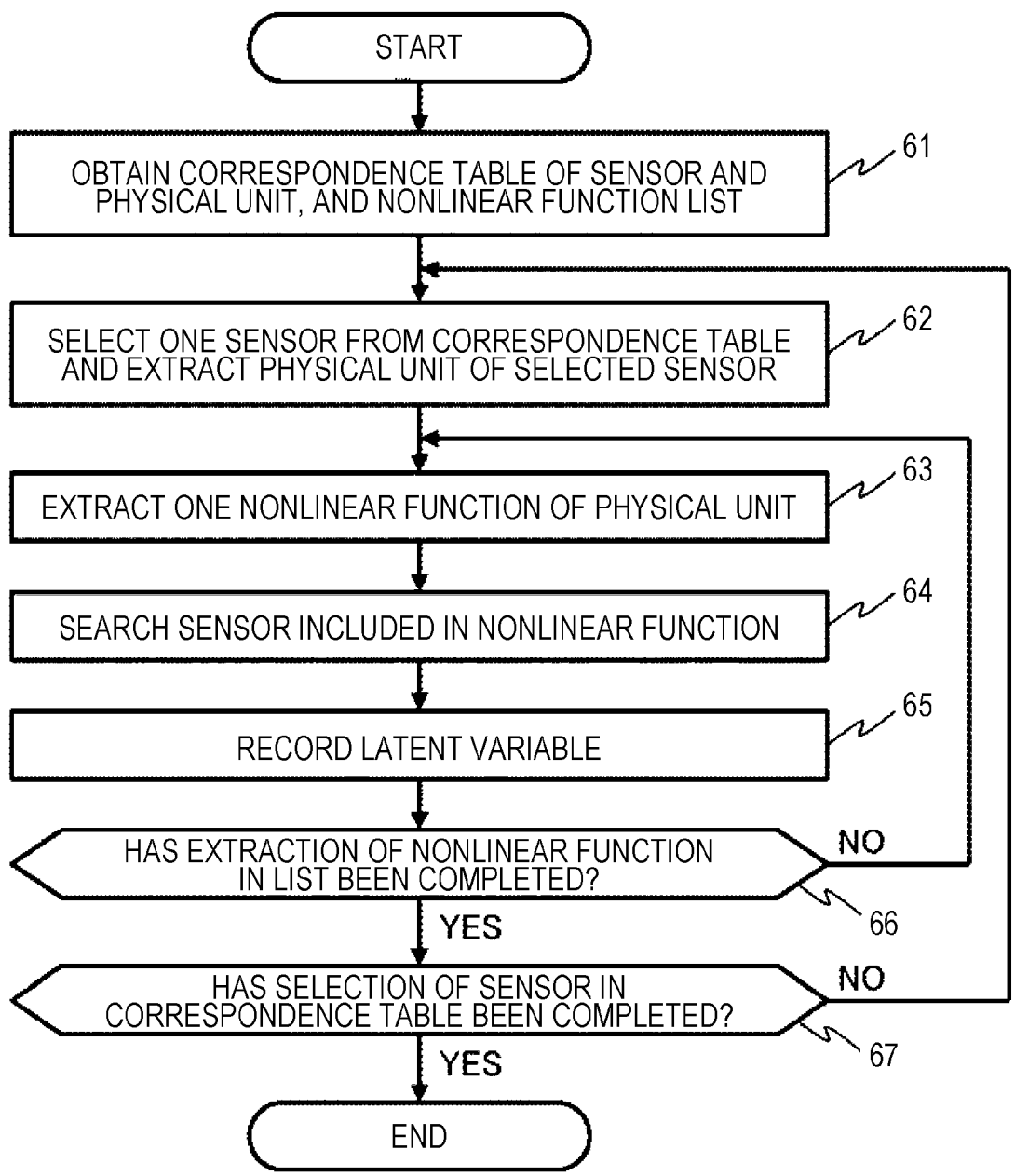
FIG. 6 is a diagram illustrating an exemplary processing flow of a latent variable generation unit.

FIG. 6 is a diagram illustrating an exemplary processing flow of the latent variable generation unit 19. First, the latent variable generation unit 19 obtains the correspondence table of the sensor ID 41, the physical quantity 42, and the physical unit 43 illustrated in FIG. 5, and then obtains a nonlinear function list of the physical unit 51 and the nonlinear function 52 (step 61). Note that when the sensor data includes information of sensor ID, physical quantity, and physical unit, the correspondence table may be created by the physical unit extraction unit 18.

The latent variable generation unit 19 selects one unselected sensor ID from among the sensor IDs included in the sensor ID 41 of the correspondence table, and extracts the physical unit 43 corresponding to the selected sensor ID (step 62). An unextracted nonlinear function is extracted from the nonlinear function 52 of the physical unit 51 matching the extracted physical unit (step 63).

The latent variable generation unit 19 searches for the sensor ID 41 corresponding to the physical unit 43 that matches the physical unit included in the argument of the extracted nonlinear function (step 64). In a case where no sensor ID 41 is found in this search, this indicates that the sensor that is not found is a missing sensor. Accordingly, the processing skips the next step 65 and proceeds to step 66. In a case where the argument of the extracted nonlinear function is a physical quantity, it is allowable to search the measured values 22 to 25.

In a case where the ID has been found in the search in step 64, the latent variable generation unit 19 records the sensor ID that has been found as an argument of the nonlinear function and in the latent variable 55 (step 65). Here, in a case where a plurality of arguments exists in the nonlinear function extracted in step 63, a sensor ID corresponding to each of these arguments is found and recorded.

The sensor ID 53 and the physical quantity 54 may be obtained by copying the sensor ID 41 and the physical quantity 42 selected as the sensor ID selected in step 62, or by copying the sensor ID 41 and the physical quantity 42 obtained in step 61. In addition to the sensor ID 53 and the physical quantity 54, a physical unit may be included.

The latent variable generation unit 19 determines whether extraction of the nonlinear function included in the nonlinear function 52 of the physical unit 51 that matches the physical unit extracted in step 62 is completed (step 66). In a case where it is determined that extraction is completed and an unextracted nonlinear function remains, the processing returns to step 63. In a case where it is determined that the extraction is completed, the processing proceeds to step 67.

The latent variable generation unit 19 determines whether the selection of the sensor ID included in the sensor ID 41 of the correspondence table obtained in step 61 is completed (step 67). In a case where it is determined that the extraction is not completed and an unselected sensor ID remains, the processing returns to step 62. In a case where it is determined that the processing is completed, the latent variable generation is to be finished.

The latent variable recorded in the latent variable 55 in step 65 is output from the latent variable generation unit 19 to the latent variable addition unit 12. In a case where the latent variable addition unit 12 has received a latent variable from the latent variable generation unit 19, the latent variable addition unit 12 adds the received latent variable to the sensor data.

The sensor data is time-series data as already described. For this reason, time-series sensor data is used to calculate latent variable values in time series. The value of the latent variable obtained by the calculation is unified to the same format as the sensor data. That is, sensor data and latent variables are merged in time series to create a new data set.

Hereinafter, this new data set will be referred to as a nonlinear data set. Moreover, both sensor data and latent variables in a nonlinear data set will be referred to as nonlinear data set variables. The latent variable addition unit 12 transmits the nonlinear data set to the latent variable selection unit 13.

In addition to the latent variable received from the latent variable generation unit 19, the latent variable addition unit 12 may generate a latent variable in a combination of sensor data and a nonlinear function. For example, it is allowable to generate (candidate) latent variables such as G (W, W), G (W, Y), and G (Y, Y) in combination of a sensor having sensor IDs of W and Y, and a nonlinear function G regardless of the physical quantity or physical unit of the sensor.

The number and complexity of the latent variables generated would change depending on the number of sensors and the order of the nonlinear function. For example, latent variables generated using sensors of sensor IDs X, Y, Z, V, and W and fifth order polynomials include complex variables such as G (X, Y, Z, V, and W) with an increased the number of combinations. The number of sensors and the order of the nonlinear function affect the complexity and accuracy of the physical model and therefore will be elaborated further below. Note that the nonlinear function G may be preliminarily registered in a function table other than the nonlinear function list.

The latent variable selection unit 13 calculates a correlation between the variables of the nonlinear data set, and a result of this calculation is to be a correlation coefficient matrix. While the present embodiment calculates the Pearson correlation coefficient described above, other correlation coefficient calculation and other parameters for evaluating inter-variable association may be used.

In calculating the correlation coefficient, it is possible to calculate one correlation coefficient by using a large amount of data from two sensors. Still, since the sensor data is time series, data of a preset period or a preset number is to be used from a preset time along passage of time so as to calculate the correlation coefficient at that time. This time may be a plurality of times, and a plurality of correlation coefficients may be calculated.

In subsequent processing, a correlation coefficient at a specific time may be used, or an average value of correlation coefficients at a plurality of adjacent times may be used for stability. Moreover, latent variables with low correlation with any of other latent variables and sensor data may be removed. The latent variable selection unit 13 transmits the calculated correlation coefficient data to the grouping processing unit 14.

Figure 7:
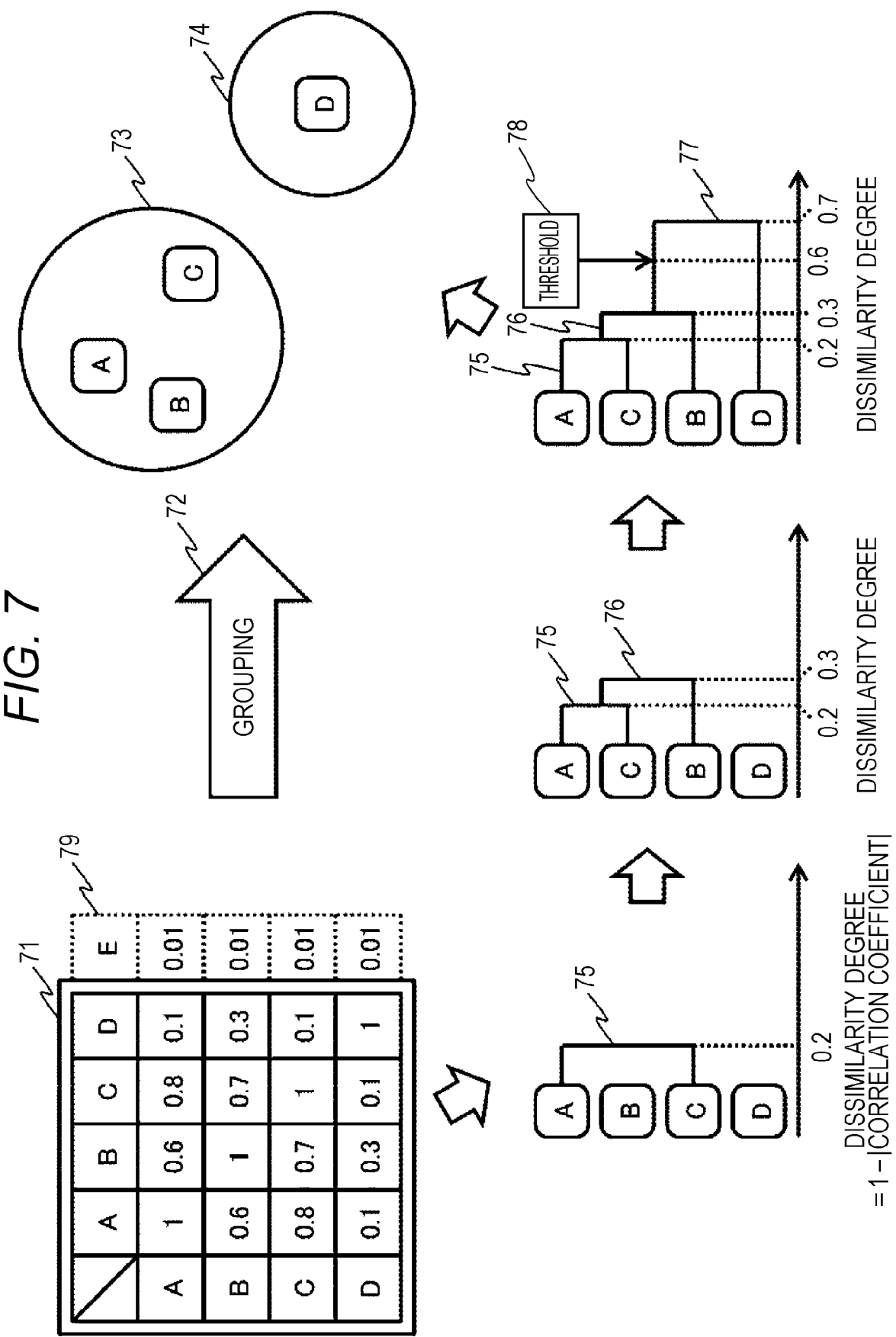
FIG. 7 is a diagram illustrating exemplary grouping processing.

FIG. 7 is a diagram illustrating exemplary grouping processing. In this example, "A", "B", "C", and "D" are variables of four nonlinear data sets. A correlation coefficient matrix 71 illustrates a result of calculating the correlation coefficient using the time-series data of these variables.

Variables undergo grouping 72 and are divided into a plurality of groups 73 to 74 on the basis of the correlation coefficient matrix 71. As already described, the latent variable 79 such as "E" having a low correlation coefficient with other "A" to "D" is removed by the latent variable selection unit 13 in order to reduce the load of the grouping processing. This removal may be performed on the basis of a preset threshold (0.05, for example).

In this example, variables are divided into the plurality of groups 73 to 74 by the hierarchical clustering method. The hierarchical clustering method is a method of grouping in order from the closest (related) combination, and it is possible to display the processing in the middle like a hierarchy and finally generate a dendrogram. Hereinafter, an example of generation of a dendrogram will be described below.

The grouping processing unit 14 first calculates, for each of correlation coefficients in the correlation coefficient matrix 71:

dissimilarity degree=1−|correlation coefficient|, and then converts the correlation coefficient to the dissimilarity.

Next, the grouping processing unit 14 extracts a variable pair having the lowest dissimilarity degree (the most approximated) among the variable pairs "A" to "D", and sets a link 75 between the variable pair "A" and "C". In this example, the dissimilarity degree between "A" and "C" is "0.2".

Then, a variable pair having a lowest dissimilarity degree value is extracted from among the variable pairs of the link 75 and "B", and the link 75 and "D", and then, a link 76 is set between the variable pair link 75 and "B". Here, the dissimilarity degree between the link 75 and "B" is calculated as a minimum value of the dissimilarity degree between "B" and each of "A" and "C" constituting the link 75. The dissimilarity degree between "B" and "A" is 0.4 and the dissimilarity degree between "B" and "C" is 0.3, and accordingly, the dissimilarity degree between the link 75 and "B" is determined as "0.3".

Furthermore, a variable pair of the link 76 and "D" is extracted, and a link 77 is set between the link 76 and "D". In this example, the dissimilarity degree between the link 76 and "D" is "0.7". With the above operation, the variables of the nonlinear data set included in the correlation coefficient matrix 71 are linked with each other, leading to formation of a dendrogram including the links 75 to 77.

In order to divide the variables, a threshold 78 that determines whether there is a correlation is set. For example, when the threshold 78 is set to "0.6", the grouping processing unit 14 determines that the link 77 having the dissimilarity degree of "0.6" or more has no correlation, and divides a combination of the variables (links) to which the link 77 is set and variables into different groups.

This causes "A", "B", and "C" to be grouped in the group 73, causes "D" to be grouped in the group 74, that is, variables are divided into the two groups 73 to 74.

While the above description uses one method of the hierarchical clustering method, other methods may be used. For example, while the nearest neighbor method is used to calculate the dissimilarity degree from the combination of variables, it is also allowable to use the Ward's method, the group average method, or the like. In addition to the hierarchical clustering method, it is allowable to use another method of dividing variables in order of association between variables.

Moreover, while the dissimilarity degree is calculated, the correlation coefficient may be used instead of the dissimilarity degree. In a case where the correlation coefficient is used, a link may be set to a pair with a high correlation coefficient by calculating an absolute value of the correlation coefficient or by calculating the square of the correlation coefficient.

Figure 8:
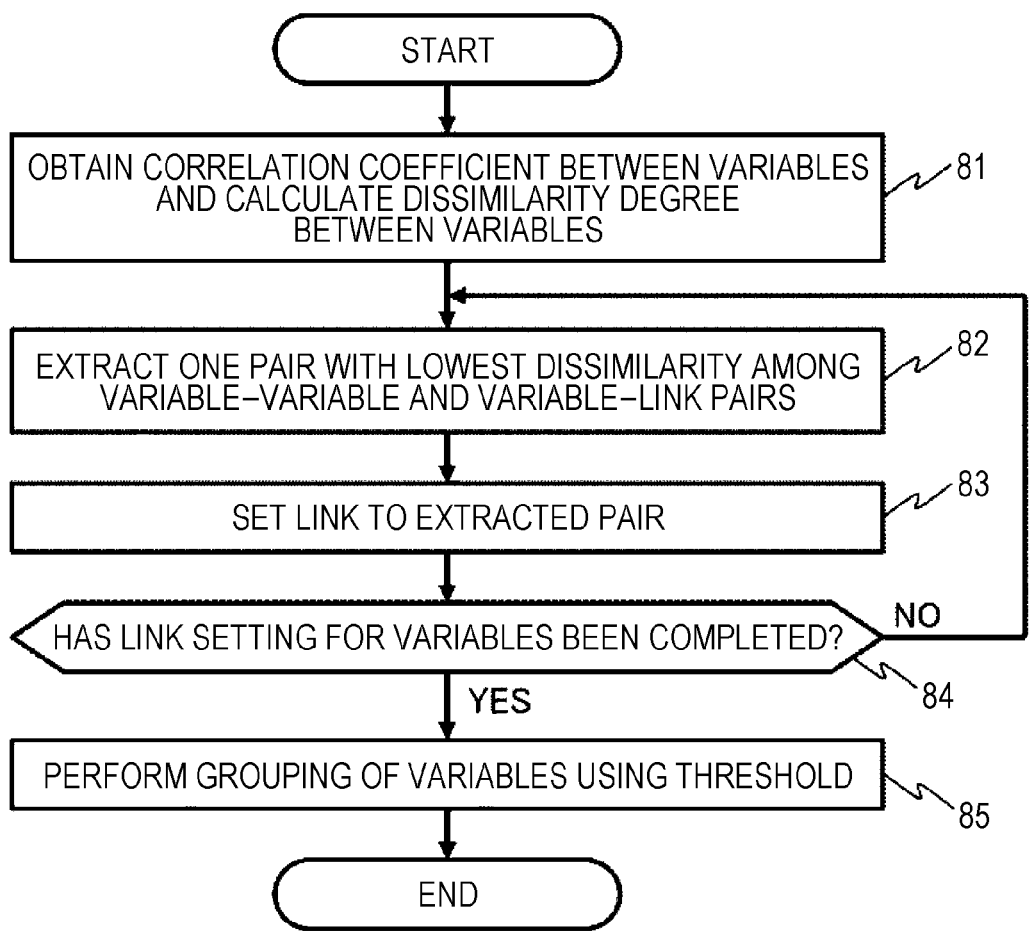
FIG. 8 is a diagram illustrating an exemplary processing flow of a grouping processing unit.

FIG. 8 is a diagram illustrating an exemplary processing flow of the grouping processing unit 14. The grouping processing unit 14 obtains a correlation coefficient between the variables of the nonlinear data set and converts the obtained correlation coefficient into the dissimilarity degree between variables (step 81). Then, one pair having the lowest converted dissimilarity degree among the pairs of the variables and variables, and the pairs of the variable and the link is extracted (step 82).

The grouping processing unit 14 sets a link between the extracted pair (step 83), determines whether the link setting to the variables of the nonlinear data set is completed (step 84). In a case where the variable to which the link is not set remains and the link setting is not completed, the processing returns to step 82, and in a case where it is determined that the processing is completed, the processing proceeds to step 85.

The grouping processing unit 14 compares a preset threshold with each of the dissimilarity degrees of the links set in step 83, extracts links having a dissimilarity degree lower than the threshold, and defines the variables combined with solely the extracted links as a group (step 85). This causes the variables of the nonlinear data set are divided into a plurality of groups, and a result of the grouping is transmitted to the relational expression estimation processing unit 15.

Figure 9:
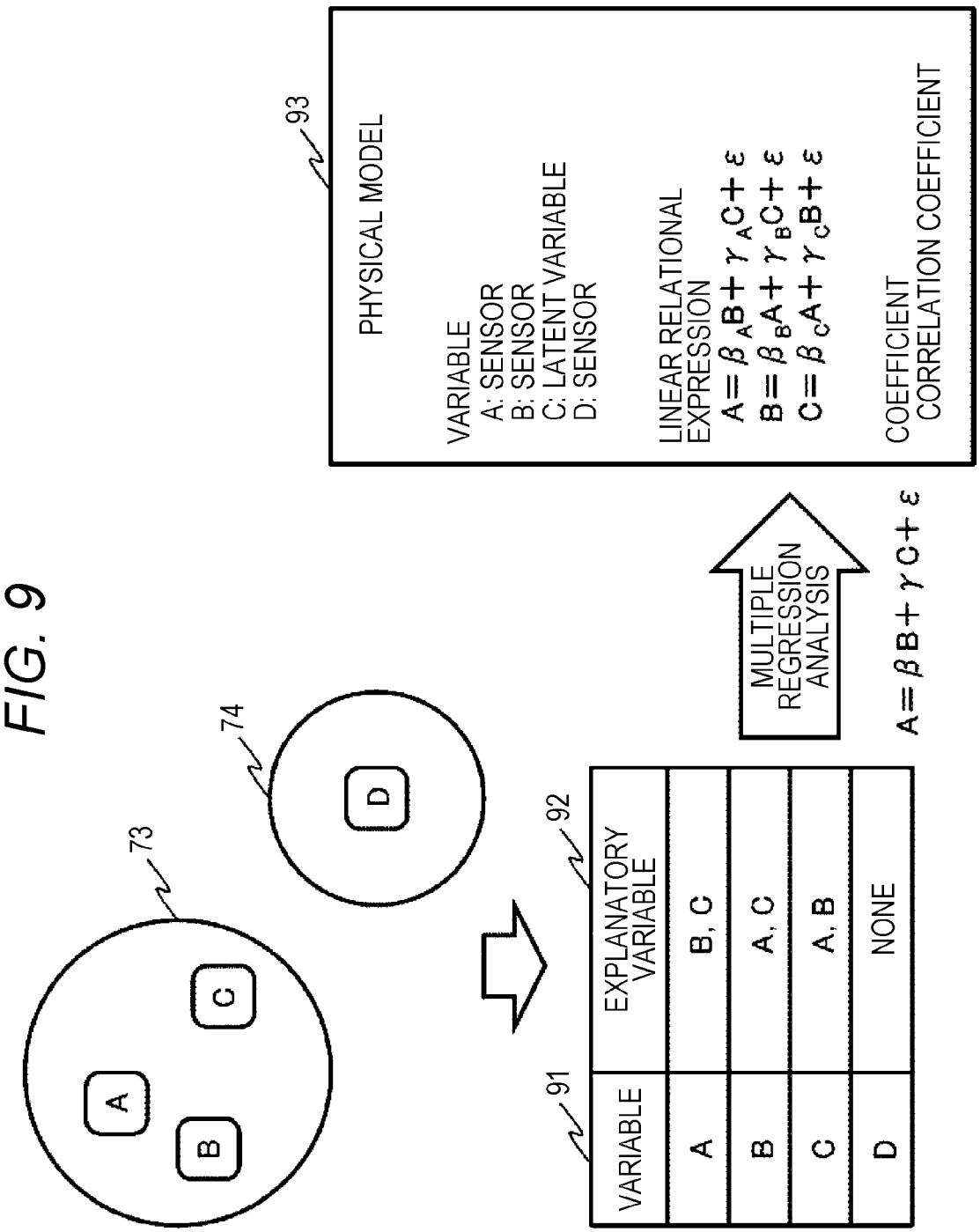
FIG. 9 is a diagram illustrating an example of estimation of variable relational expression.

FIG. 9 is a diagram illustrating an example of estimating a variable relational expression. The relational expression estimation processing unit 15 obtains coefficients of the linear relational expression using multiple regression analysis. While the relational expression here is linear, it is possible to express a nonlinear relationship in practice since a nonlinear variable has been added to the variable as described above.

First, the relational expression estimation processing unit 15 uses a grouping result to create a table of variables (objective variables) to be targets of multiple regression analysis and explanatory variables. That is, one of the variables "A" to "D" included in the result of grouping is selected one by one, the selected variable is set as a variable 91, and another variable included in a same group as the selected variable among the groups 73 to 74 is defined as an explanatory variable 92.

For example, when "A" included in the group 73 is defined as a variable 91, each of "B" and "C" included in the same group as "A" is defined as the explanatory variable 92, as illustrated in FIG. 9.

Multiple regression analysis is an analysis for expressing one variable by a linear relational expression using a plurality of explanatory variables. For example, this is analysis of obtaining coefficients $\beta$, $\gamma$, and $\varepsilon$ in order to use a linear relational expression of $$A = \beta B + \gamma C + \varepsilon$$

when expressing "A" of the variable 91 using "B" and "C" included in the explanatory variable 92.

The relational expression estimation processing unit 15 also obtains coefficients by "multiple regression analysis" for "B" and "C" of the variable 91, and defines coefficients $\beta_B$, $\gamma_B$, and $\varepsilon$, and coefficients $\beta_C$, $\gamma_C$, and $\varepsilon$, respectively. With this analysis, "A" to "C" of the variable 91 are expressed by a linear relational expression. With respect to "D" of the variable 91, there is no linear relational expression because there are no other variables in the group 74.

Then, the relational expression estimation processing unit 15 creates a physical model 93. The physical model 93 is constituted with variables, linear relational expressions, and coefficients. For example, as a variable, a sensor ID and a variable type corresponding to individual variables are recorded, for example, "A": "sensor", "B": "sensor", "C": "latent variable", and "D": "sensor".

As a linear relational expression, a linear relational expression that expresses "A", "B", and "C" is recorded including a value of the coefficient. The calculation result of the correlation coefficient is recorded as the coefficient. The relational expression estimation processing unit 15 transmits the physical model 93 to the physical model display unit 16 and the abnormality predictor diagnosis processing unit 2.

Figure 10:
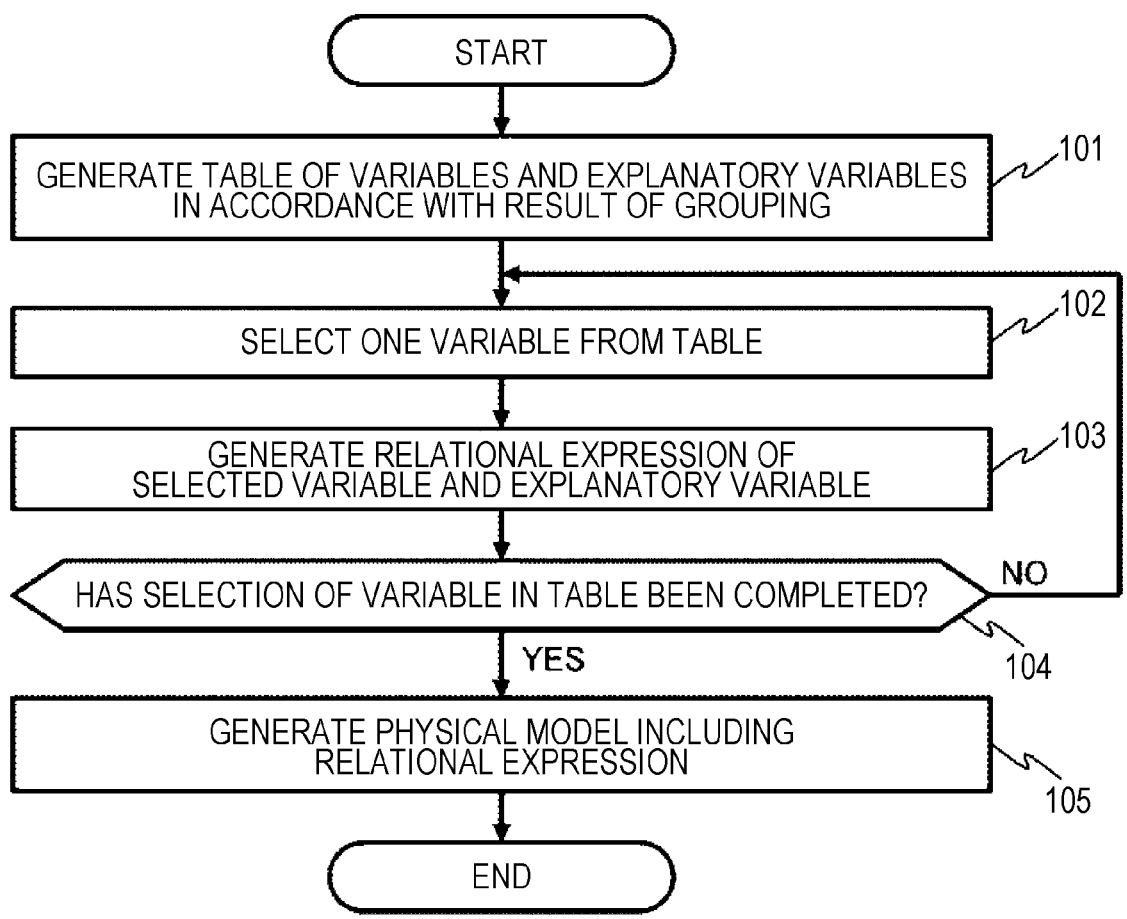
FIG. 10 is a diagram illustrating an exemplary processing flow of a relational expression estimation processing unit.

FIG. 10 is a diagram illustrating an exemplary processing flow of the relational expression estimation processing unit 15. The relational expression estimation processing unit 15 creates a table of variables and explanatory variables from a grouping result of the grouping processing unit 14 (step 101). Then, one unselected variable is selected from the created table (step 102), and the coefficients of the linear relational expression of the variable and the explanatory variable are obtained by the multiple regression analysis method for the selected variable (step 103).

The relational expression estimation processing unit 15 determines whether the selection of the variable from the created table is completed (step 104). In a case where it is determined that unselected variables remain in the table and selection is not completed, the processing returns to step 102. In a case where it is determined that the selection is completed, this means the finish of the creation of the linear relational expression. Accordingly, the processing proceeds to step 105, at which a physical model is generated by collecting the information of the created linear relational expression, variables, and coefficients (step 105) and this completes the relational expression estimation processing.

As described above, the complexity and accuracy of the physical model are affected by two parameters, that is, the number of sensors and the order of the nonlinear function. With a combination of a large number of sensors and a high order nonlinear function, it is possible to generate a complex latent variable, enabling expressing of a complicated physical phenomenon of an apparatus as a sensing target.

In this case, the accuracy of the physical model increases, whereas the calculation time increases exponentially. In order to set this important parameter, the present embodiment is configured to adjust parameters so as to enable first generating a physical model with a simple setting, then, evaluating the accuracy of the physical model, and satisfying accuracy requirement.

For example, the number of sensors including a latent function is initially set to two and the order of a nonlinear function (polynomial) is set to two. Using this setting, a physical model is generated as described above. Then, sensor data is assigned to the generated physical model, and the accuracy of the physical model is evaluated using a difference between the time-series predicted variables and the time-series actual measurements. The number of sensors and the order of the nonlinear function are increased in accordance with the evaluated accuracy.

For example, the number of sensors is set to three and the order of the nonlinear function is set to three. The set value is transmitted from the user correction processing unit 17 to the latent variable addition unit 12 to regenerate a physical model. This processing makes it possible to obtain a complex and highly accurate model from a simple physical model.

Figure 11:
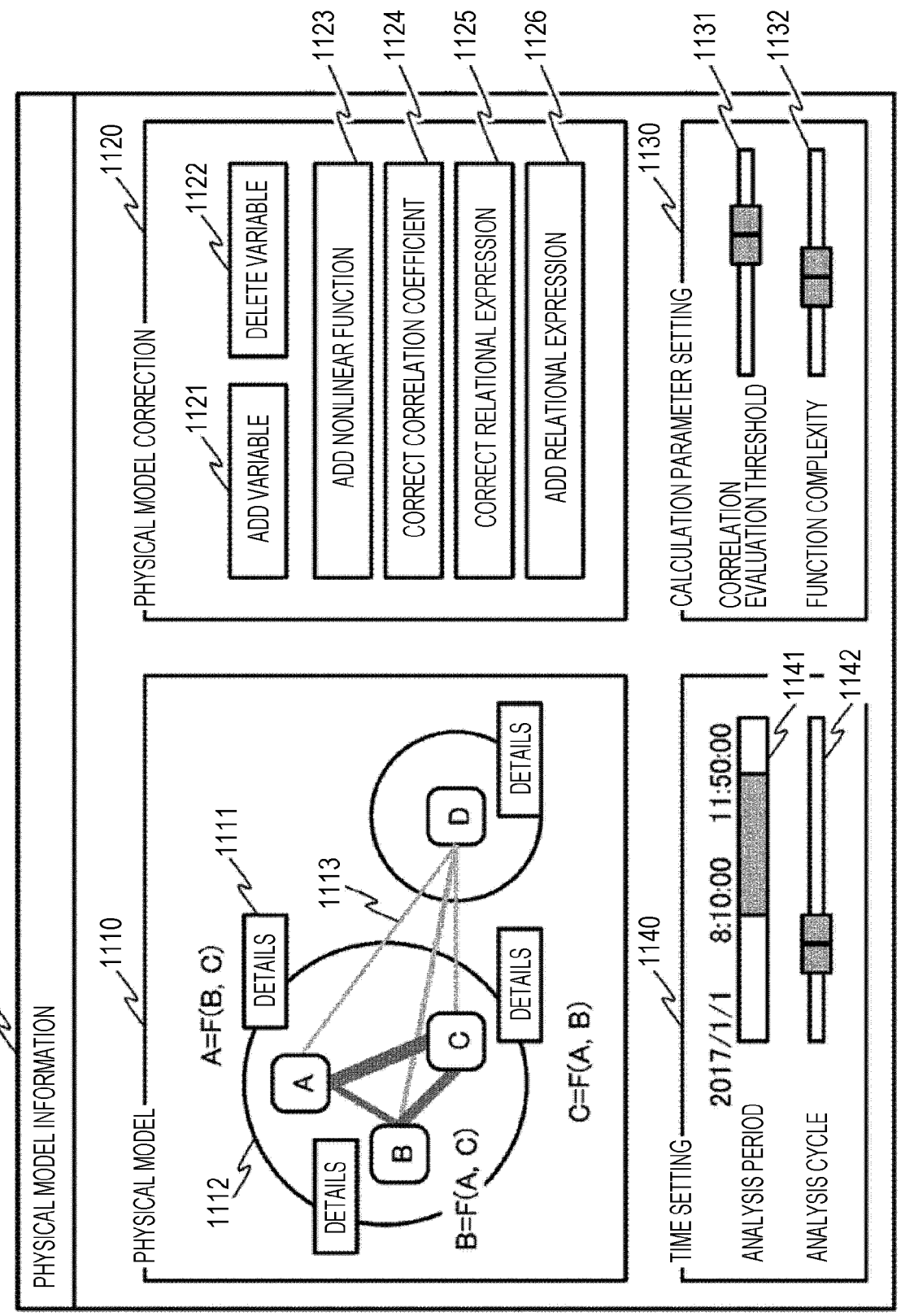
FIG. 11 is a diagram illustrating an exemplary screen displaying a physical model.

FIG. 11 is a diagram illustrating an exemplary screen displaying a physical model. A screen 1101 has four regions, namely, a region 1110 of "physical model", a region 1120 of "physical model correction", a region 1130 of "calculation parameter setting", and a region 1140 of "time setting". These screens will be described in order below.

In the region 1110 of "physical model", a physical model including variables, relational expressions, and correlation coefficients is displayed in a graph. In the example of FIG. 11, the variable is displayed as "A", "B", "C", and "D". When clicking on a "detail" button 1111 next to those displays is detected, detailed information associated with each of the variables is displayed. For example, when the click on the "detail" button of "A" is detected, the configuration data of the variable "A", the coefficients of the linear relational expression, or the like are displayed.

A group is displayed by a circle 1112 around the variables. A variable and another variable are linked by a straight line 1113, in which the width of the straight line 1113 represents the degree of correlation between the variables, while the density or color of the straight line 1113 represents the stability of the correlation coefficient. The stability of the correlation coefficient is the stability with respect to the lapse of time. It is allowable to configure such that when it is determined that the state of the correlation coefficient within the preset variation threshold continues for a time longer than a preset time, the line is displayed in a dark tone.

The display of this "physical model" is a display provided to enhance understanding of the configuration of the physical model. In contrast, as will be described below, it is also possible to receive user's operation and correct the physical model.

The region 1120 of "physical model correction" receives corrections associated with variables, correlation coefficients, and relational expressions. The "add variable" button 1121 is a button for adding a latent variable or a variable of sensor data. It is allowable to configure to receive an input of a nonlinear function or a sensor ID after detection of clicking on the "add variable" button 1121.

This enables addition of latent variables such as nonlinear function (EXP (A×D)) by the user's experience. Moreover, provided that there is sensor data, addition of a new sensor would be possible.

A "delete variable" button 1122 is a button for deleting unnecessary sensor data or variables of latent variables. It is allowable to configure to receive an input of the variable "A" or the like after detection of clicking on the "delete variable" button 1122. This enables removal of a variable that simply counts time such as operating time, if any.

An "add nonlinear function" button 1123 is a button for adding a nonlinear function applicable to a plurality of types of sensor data, not for adding individual variables (latent variables). It is allowable to configure to receive an input of a nonlinear function after detection of clicking on the "add nonlinear function" button 1123. This makes it possible to handle a case of using a special function depending on the apparatus as a sensing target.

A "correct correlation coefficient" button 1124 is a button for correcting the correlation coefficient. It is allowable to configure to receive an input of a correction target and a value of the nonlinear function after detection of clicking on the "correct correlation coefficient" button 1124. It is also allowable that the corrected correlation coefficient be reflected in a width of a straight line 1113 displayed in the "physical model".

A "correct relational expression" button 1125 is a button for modifying a coefficient of a linear relational expression. It is allowable to configure to receive an input of a correction target and a value of the coefficient after detection of clicking on the "correct relational expression" button 1125. An "add relational expression" button 1126 is a button for adding a linear relational expression. It is allowable to configure to receive an input of an expression including an explanatory variable and a coefficient after detection of clicking on the "add relational expression" button 1126.

The region 1130 of "calculation parameter setting" receives a setting related to a threshold of a correlation coefficient and an order of a nonlinear function. A slider 1131 of a "correlation evaluation threshold" is a slider for setting a threshold of a correlation coefficient for the grouping described with reference to FIG. 7. When the setting of the slider 1131 indicating the "correlation evaluation threshold" of 0.4 is detected, it is determined that there is no correlation between variable pairs having a correlation coefficient less than 0.4.

A slider 1132 of "function complexity" is a slider for setting the number of variables in the nonlinear function. An increase in the number of variables set by this slider 1132 of "function complexity" would lead to creation of a complicated latent variable, while the calculation time of the nonlinear function is prolonged.

For example, when the complexity is set to 2, a latent variable including two pieces of sensor data such as F (X, Y) or F (Y, Z) is created, while when the complexity is set to 5, a latent variable including five pieces of sensor data such as F (V, W, X, Y, and Z) is created. Complexity may be adjusted in accordance with the configuration of the apparatus as a sensing target, calculation time, or the like.

Since corrections received by the region 1120 of "physical model correction" and the region 1130 of "calculation parameter setting" affect physical model creation, it is necessary to re-create the physical model by performing recalculation on the basis of the correction. Therefore, the received correction is converted into a conditional expression by the user correction processing unit 17.

In a case where the user correction processing unit 17 adds (EXP(A)) to a variable as conversion from a correction to a conditional expression, the user correction processing unit 17 converts it into a single script line such as (+EXP (A)), for example. In a case where the variable B is to be deleted, B is converted to a single script such as (−B). Furthermore, a correlation coefficient between the variable D and the variable E is to be corrected, the correction is converted into a single script line such as (CC (D, E)=0.8).

As described above, the user correction processing unit 17 converts the received correction into a conditional expression and records it, and transmits a result of the recording (hereinafter referred to as a correction list) to the latent variable addition unit 12. Processing from the latent variable addition unit 12 to the physical model display unit 16 is the repetition of the processing already described, while confirmation is performed onto the correction list before or after execution of each of processing for recalculation.

For example, the latent variable addition unit 12 refers to the correction list after adding the latent variable, and in a case where there is a script to which a variable is to be added, the variable is added in accordance with the script. Moreover, the latent variable selection unit 13 refers to the correction list after calculating the correlation coefficient, and in a case where there is a script to which the correlation coefficient is to be set, the correlation coefficient is overwritten in accordance with the script. In this manner, the received correction is reflected.

The region 1140 of "time setting" receives a setting related to the time of sensor data to be analyzed in order to create a physical model. The slider 1141 of "analysis period" is a slider for setting the start time and the end time of the period to be analyzed.

For example, when it is detected that the setting "8:10:00" and "11:50:00" has been made by the slider 1141 of "analysis period" by the user's intention of creating a physical model with sensor data in the morning, the time periods "8:10:00" to "11:50:00" among the time information 21 and 31 of the sensor data illustrated in FIGS. 2 and 3 are determined as analysis targets for creating the physical model.

The slider 1142 of "analysis cycle" is a slider for setting the analysis cycle within the period set by the slider 1141 of "analysis period". For example, when calculating the correlation coefficient by the Pearson calculation method, {(xi, yi)} (i=1, . . . , n) is the calculation target as described above, and there is no need to achieve matching between the time from i=1 to i=n and the period set by the slider 1141 of "analysis period".

Therefore, when a setting of 10 minutes by the slider 1142 of "analysis cycle" is detected, a physical model is created by repetition of a cycle of 10 minutes from the start time of the period set by the slider 1141 of "analysis period".

For example, a correlation coefficient is calculated as sensor data included from "8:10:00" to 8:20:00 defined as sensor data from i=1 to i=n and a physical model is created. Next, a correlation coefficient is calculated as sensor data included from "8:20:00" to 8:30:00 defined as new sensor data from i=1 to i=n and a next physical model is created.

The slider 1141 of "analysis period" may include a slider of the time of the physical model to be displayed in addition to the start time and the end time. When it is detected that the time of the physical model to be displayed has been set within the period from the start time to the end time, the physical model created by using the sensor data of the analysis cycle including the set time may be displayed in the region 1110 of the "physical model".

Note that the region 1140 of "time setting" may be omitted, and the "analysis period", "analysis cycle", and the time of the physical model to be displayed may be fixed preset times. Furthermore, when the "time setting" region 1140 is provided and the "analysis cycle" is set, it affects the creation of the physical model.

For this reason, the user correction processing unit 17 converts the "analysis cycle" into the conditional expression so as to perform recalculation on the basis of the set "analysis cycle" and the physical model is recreated in a same manner as the correction received in the region 1120 of "physical model correction" and the region 1130 of "calculation parameter setting", and transmits the converted conditional expression to the latent variable addition unit 12.

Figure 12:
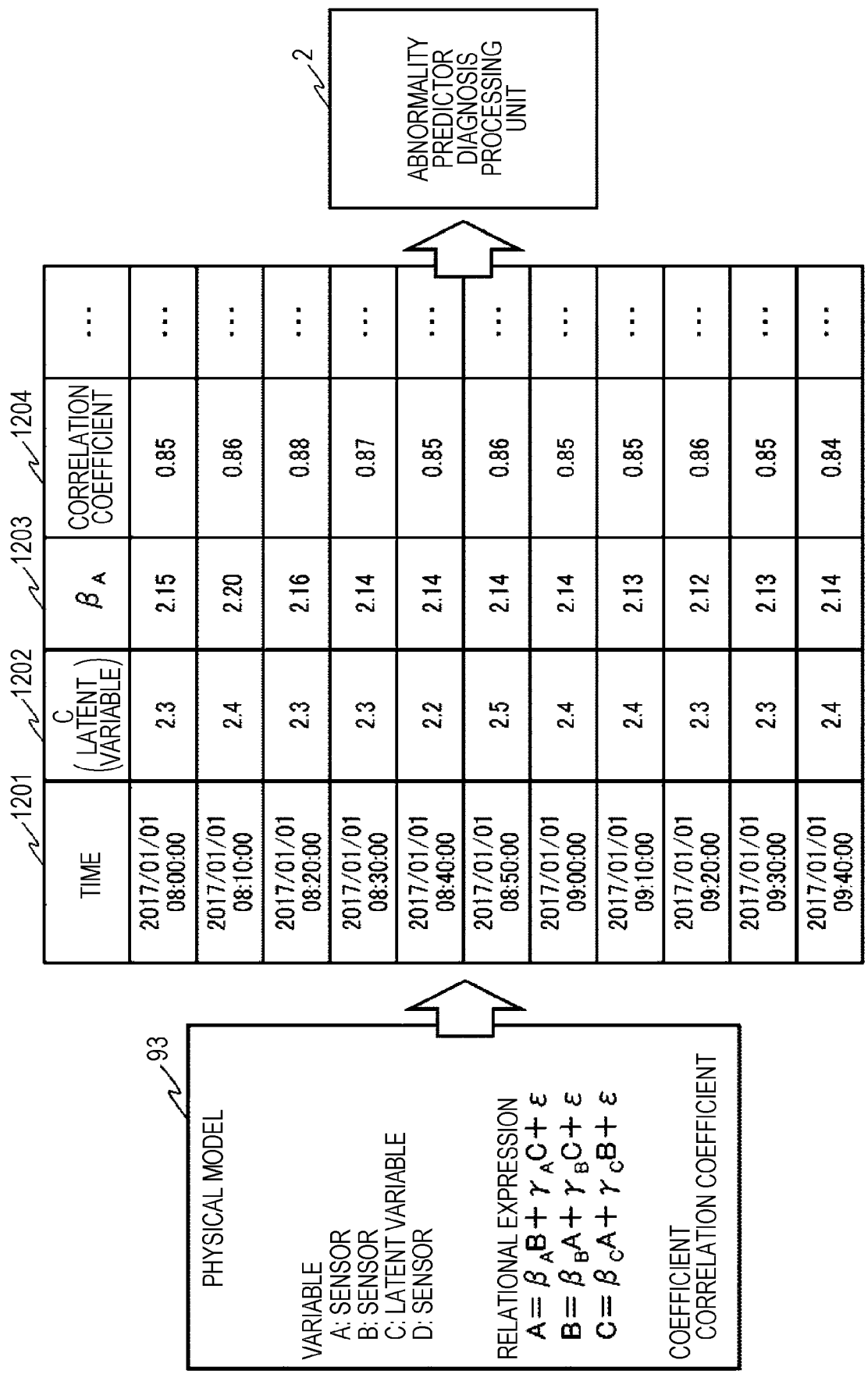
FIG. 12 is a diagram illustrating an example of abnormality diagnosis using a physical model.

FIG. 12 is a diagram illustrating an example of abnormality diagnosis using a physical model. The physical model 93 created by the relational expression estimation processing unit 15 is transmitted to the abnormality predictor diagnosis processing unit 2 in order to determine whether the state of the apparatus as the sensing target is abnormal. The transmission of the physical model 93 may be the transmission of the physical model at each of times of the time information 1201. The physical model at each of times may be a latent variable 1202, a coefficient 1203 of a linear relational expression, a correlation coefficient 1204, or the like.

While the latent variable 1202 is set to "C" in the example of FIG. 12, there is no limitation to this, and other variables may be used. While the coefficient 1203 of the linear relational expression is set to "β" in the example of FIG. 12, there is no limitation to this, and other coefficients may be used. In addition, the correlation coefficient 1204 may be a plurality of coefficients.

In general, the abnormality predictor diagnosis uses past normal sensor data to learn a cluster of normal sensor data, and compares the cluster of current sensor data with the cluster of normal sensor data, thereby determining whether there is an abnormality.

Figure 13:
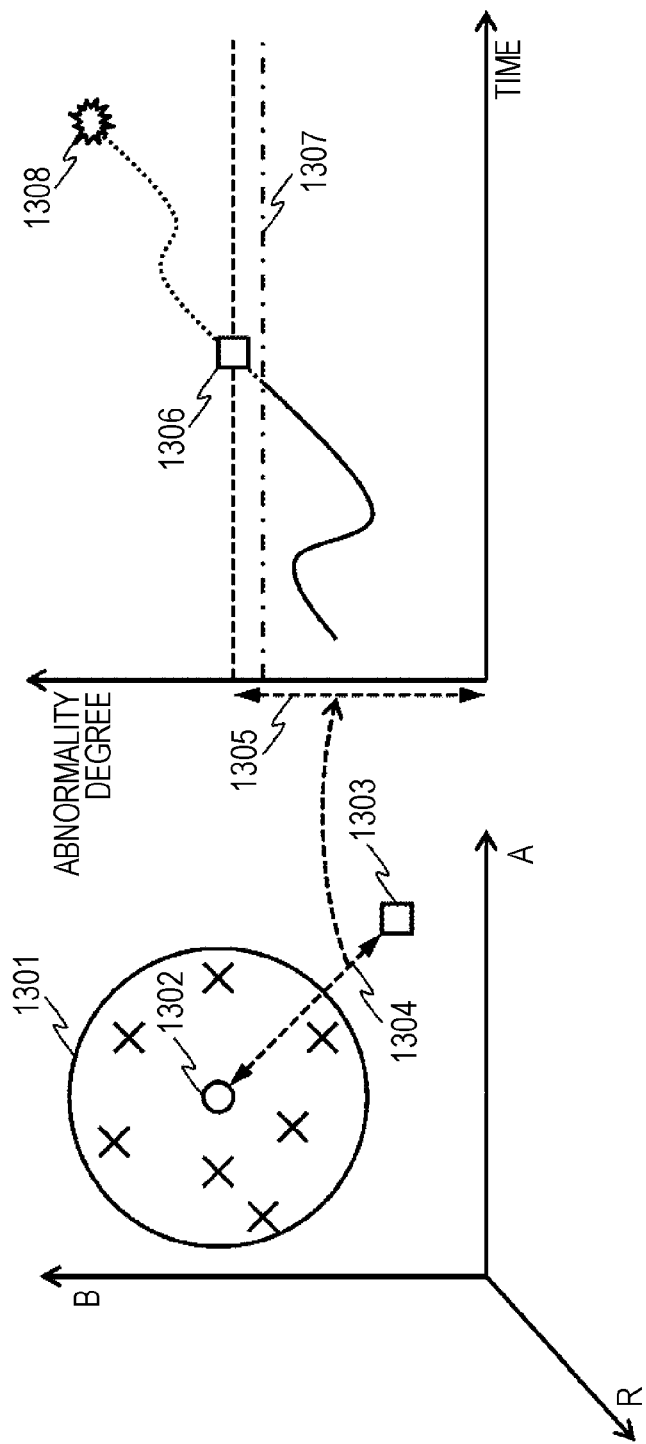
FIG. 13 is a diagram illustrating an example of diagnosing abnormality.

For example, as illustrated in FIG. 13, when there are variables "A" and "B" being sensor data, individually, and when normal sensor data of "A" and "B" is formed into a two-dimensional graph, a normal distribution can be represented by a circular cluster 1301. The center of the circle of the cluster 1301 or the center of gravity of sensor data included in the cluster 1301 is defined as a point 1302.

When the diagnosis target is sensor data 1303, a distance 1304 from the point 1302 to the sensor data 1303 is calculated, and the calculated distance 1304 indicates the abnormality degree. The abnormality degree is a measure indicating high possibility of reaching a fault occurrence value 1308 when it exceeds a threshold 1307. Accordingly, the distance 1304 is converted into the abnormality degree 1305, and an abnormality diagnosis (detection) is made at a point 1306 at which the threshold 1307 is exceeded in a change according to the passage of time.

While the examples of "A" and "B" are two-dimensional sensor data containing one cluster 1301, diagnosis may be performed on the basis of a plurality of clusters in three or more dimensions using more pieces of sensor data and latent variables.

Not only sensor data and latent variables, but also correlation coefficients may be used. In this case, in addition to the variables "A" and "B", the correlation coefficient "R" may be used to form a three-dimensional graph. In this case, the cluster 1301 becomes spherical and a distance 1304 in three dimensions would represent the abnormality degree.

In order to enhance abnormality predictor diagnosis accuracy, a physical model may be used instead of the sensor data, the latent variable, and the correlation coefficient. The sensor data at each of times reflects the state of the apparatus as a sensing target at that time, and the physical model at each of times can more accurately reflect the state of the apparatus.

For example, as illustrated in FIG. 12, coefficients of a linear relational expression are used in addition to variables such as sensor data and correlation coefficients. The coefficients of the linear relational expression may be calculated at every preset time (for example, every 10 minutes) to generate a physical model, and the abnormality degree of each of the plurality of coefficients with respect to the normal coefficient may also be calculated to determine the abnormality.

Furthermore, the sensor data and the latent variable as diagnosis target at each of times may be assigned to an explanatory variable of a linear relational expression of a normal physical model to calculate the (objective) variable. Then, the sensor data or a latent variable corresponding to the calculated (objective) variable, that is, the sensor data or the latent variable as the diagnosis target at that time may be compared with the calculated (objective) variable to determine the abnormality.

As described above, since latent variables are generated from sensor data, the linear relational expression constituting the physical model can be expressed not only by the variables of the sensor data but also by a large amount of variables. Since such a linear relational expression can be generated, it is also possible to enhance the accuracy of the physical model. In addition, since latent variables are generated by nonlinear functions, nonlinear relationships can also be expressed by linear relational expressions.

A large amount of variables are generated by generation of a latent variable and this increases the processing load of generating a linear relational expressions. Still, a variable is selected on the basis of the correlation between the variables, making it possible to suppress an increase in the processing load. Moreover, variables are divided into groups on the basis of correlation and linear relational expressions are generated for each of the groups. This makes it possible to exclude analysis of variables with less affects in generation of linear relational expressions.

Even when the generation of the variables is not sufficient, it is possible to correct the variables by user's operation, enabling further enhancement of the accuracy of physical models. With the use of a normal physical model for diagnosis, it is possible to make determination by integrating the effects of a plurality of variables.

What is claimed is:

1. An abnormality predictor diagnosis system that diagnoses time-series sensor data, the abnormality predictor diagnosis system comprising:
   a preprocessor communicatively coupled to an input/output device, the preprocessor configured to:
   associate, using a correspondence table, sensor data and a plurality of physical units with each other;
   associate, using a list, the plurality of physical units and a nonlinear function with each other;
   obtains sensor data, via the input/output device, and specify one of the plurality of physical units from the obtained sensor data on the basis of the correspondence table;

specify, on the basis of the list, a nonlinear function from the one of the plurality of physical units specified, and generates a latent variable for applying the sensor data to the specified nonlinear function;

obtain the time-series sensor data, via the input/output device, and sets the data as a variable, apply the obtained time-series sensor data to the latent variable generated to generate time-series data and sets the data as a variable, and adds the generated time-series data to the obtained time-series sensor data to generate a data set of a plurality of variables; and analyze a relationship between the variables of the data set generated, and generates a linear relational expression, wherein the list associates a plurality of nonlinear functions each of which is a function of the plurality of physical units with one of the plurality of physical units, wherein the preprocessor specifies the plurality of nonlinear functions to generate a plurality of latent variables, and generates a plurality of pieces of time-series data and sets the data as a plurality of variables, and adds the plurality of pieces of generated time-series data to the obtained time-series sensor data.

2. The abnormality predictor diagnosis system or according to claim 1, wherein the plurality of physical units associated with the nonlinear function in the list is volt in a case where the sensor data is voltage, ampere in a case where the sensor data is current, and watt in case where the sensor data is power.

3. The abnormality predictor diagnosis system according to claim 1, the preprocessor is further configured to:

register, a function table, a nonlinear function, and wherein, the preprocessor applies the obtained time-series sensor data to the nonlinear function registered in the function table to further generate time-series data and set the data as a variable.

4. The abnormality predictor diagnosis system according to claim 1, the preprocessor is further configured to:

calculate, a correlation coefficient between the variables in the data set generated, and selects a variable determined to have a correlation coefficient with respect to another variable higher than a preset threshold from among the data sets generated, and wherein the preprocessor analyzes a relationship between the variables selected.

5. The abnormality predictor diagnosis system according to claim 4, the preprocessor is further configured to:

divide the variables selected into groups on the basis of the correlation coefficient calculated, and wherein the preprocessor analyzes a relationship between variables included in each of the groups divided.

6. The abnormality predictor diagnosis system according to claim 5, wherein the preprocessor calculates a dissimilarity degree from the correlation coefficient calculated, applies a hierarchical clustering method to the calculated dissimilarity degree, obtains a dissimilarity degree between the variable selected and a combination of the variables, and divides the variables into groups by defining a combination of the variables each having obtained the dissimilarity degree lower than a preset threshold into a group.

7. The abnormality predictor diagnosis system according to claim 6, wherein the preprocessor in each of the groups divide, generates a combination of an objective variable and an explanatory variable from the variables included in the group, performs multiple regression analysis onto the generated combination of the objective variable and the explanatory variable, and generates a linear relational expression.

8. The abnormality predictor diagnosis system according to claim 7, wherein the preprocessor generates a physical model including the generated linear relational expression.

9. The abnormality predictor diagnosis system according to claim 8, the preprocessor is further configured to display the generated physical model, and receives operation of adding or deleting the time-series sensor data obtained by the input/output device and operation of adding or deleting a nonlinear function associated on the correspondence table.

10. The abnormality predictor diagnosis system according to claim 9, wherein the preprocessor receives operation of correcting the threshold to be compared with the dissimilarity degree.

11. An abnormality predictor diagnosis system that diagnoses time-series sensor data, the abnormality predictor diagnosis system comprising:

a preprocessor communicatively coupled to an input/output device, the preprocessor configured to:

associate, using a correspondence table, sensor data and a plurality of physical units with each other;

associate, using a list, the plurality of physical units and a nonlinear function with each other;

obtain sensor data, via the input/output device, and specify one of the plurality of a physical units from the obtained sensor data on the basis of the correspondence table;

specify, on the basis of the list, a nonlinear function from the one of the plurality of physical units specified, and generates a latent variable for applying the sensor data to the specified nonlinear function;

obtain the time-series sensor data, via the input/output device, and sets the data as a variable, apply the obtained time-series sensor data to the latent variable generated to generate time-series data and sets the data as a variable, and adds the generated time-series data to the obtained time-series sensor data to generate a data set of a plurality of variables;

analyze a relationship between the variables of the data set generated, and generates a linear relational expression; and detect a predictor of abnormality on the basis of the physical model generated, wherein the preprocessor generates a linear relational expression including a coefficient, and wherein the preprocessor further includes a normal physical model, and detects a predictor of abnormality on the basis of a coefficient of the linear relational expression of the normal physical model and the coefficient of the linear relational expression generated.

12. The abnormality predictor diagnosis system according to claim 11, wherein the preprocessor obtains time-series normal sensor data, generates a normal physical model, and applies one of sensor data as a diagnosis target and a latent variable as a diagnosis target generated to the linear relational expression of the normal physical model generated so as to detect a predictor of abnormality.

13. An abnormality predictor diagnosis system that diagnoses time-series sensor data, the abnormality predictor diagnosis system comprising:

a preprocessor communicatively coupled to an input/output device, the preprocessor configured to:
associate, using a correspondence table, sensor data and a plurality of physical units with each other;
associate, using a list, the plurality of physical units and a nonlinear function with each other;
obtain sensor data, via the input/output device, and specify one of the plurality of physical units from the obtained sensor data on the basis of the correspondence table;
specify, on the basis of the list, a nonlinear function from the one of the plurality of physical units specified, and generates a latent variable for applying the sensor data to the specified nonlinear function;
obtain the time-series sensor data, via the input/output device, and sets the data as a variable, apply the obtained time-series sensor data to the latent variable generated to generate time-series data and sets the data as a variable, and adds the generated time-series data to the obtained time-series sensor data to generate a data set of a plurality of variables;
analyze a relationship between the variables of the data set generated, and generates a linear relational expression; and
detect a predictor of abnormality on the basis of the physical model generated, wherein the preprocessor
obtains time-series normal sensor data,
generates a normal physical model, and
applies one of sensor data as a diagnosis target and a latent variable as a diagnosis target generated to the linear relational expression of the normal physical model generated so as to detect a predictor of abnormality.

* * * * *